(12) United States Patent
Miyahara et al.

(10) Patent No.: US 8,936,302 B2
(45) Date of Patent: Jan. 20, 2015

(54) VEHICLE STRUCTURE

(71) Applicant: Honda Motor Co., Ltd, Tokyo (JP)

(72) Inventors: Tetsuya Miyahara, Wako (JP); Shosuke Ohhama, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 14/016,352

(22) Filed: Sep. 3, 2013

(65) Prior Publication Data

US 2014/0246882 A1 Sep. 4, 2014

(30) Foreign Application Priority Data

Mar. 4, 2013 (JP) ................................ 2013-042419

(51) Int. Cl.
*B60K 37/00* (2006.01)
*B62D 21/00* (2006.01)

(52) U.S. Cl.
CPC ..................................... *B62D 21/00* (2013.01)
USPC .................................................. 296/203.01

(58) Field of Classification Search
CPC ..... G06F 1/187; G06F 1/184; H01L 2924/00; A47F 5/0846; E04C 2003/026; B23K 20/122; B23K 2201/045; B23K 33/00; B23K 20/126; G03G 15/0822
USPC ........... 296/203.01, 193.08, 203.04; 280/781; 52/60
See application file for complete search history.

(56) References Cited

U.S. PATENT DOCUMENTS

| | | | | |
|---|---|---|---|---|
| 5,810,428 A | * | 9/1998 | Maki | 296/203.02 |
| 5,860,694 A | * | 1/1999 | Seefried et al. | 296/203.03 |
| 5,941,597 A | * | 8/1999 | Horiuchi et al. | 296/203.01 |
| 6,679,523 B2 | * | 1/2004 | Yamamoto et al. | 280/785 |
| 7,445,269 B2 | * | 11/2008 | Yustick et al. | 296/187.01 |
| 7,488,022 B2 | * | 2/2009 | Belwafa et al. | 296/29 |
| 8,613,461 B2 | * | 12/2013 | Young et al. | 280/124.109 |
| 2006/0284449 A1 | * | 12/2006 | Miyahara | 296/204 |
| 2013/0249250 A1 | * | 9/2013 | Ohhama et al. | 296/204 |
| 2014/0197664 A1 | * | 7/2014 | Ezzat et al. | 296/203.01 |
| 2014/0248508 A1 | * | 9/2014 | Ohhama et al. | 428/638 |
| 2014/0248510 A1 | * | 9/2014 | Sayama et al. | 428/653 |

FOREIGN PATENT DOCUMENTS

JP 2006-347348 A 12/2006

OTHER PUBLICATIONS

Proving Document for Exception to Lack of Novelty filed in corresponding Japanese application No. 2013-042419, w/ English translation.

* cited by examiner

*Primary Examiner* — Kiran B Patel
(74) *Attorney, Agent, or Firm* — Westerman, Hattori, Daniels & Adrian, LLP

(57) ABSTRACT

A flange of a left rear side portion (aluminum member) includes a plane section extending toward a vertical wall of a left side member (steel plate-like member). The left side member includes a bent portion formed as a result of being bent between a flange and the vertical wall of the left side member, and a base section, which serves as a start point at which the bent section starts to be bent from the flange of the left side member. The plane section of the left rear side portion is provided such that it covers an area substantially up to the base section of the left side member.

3 Claims, 13 Drawing Sheets

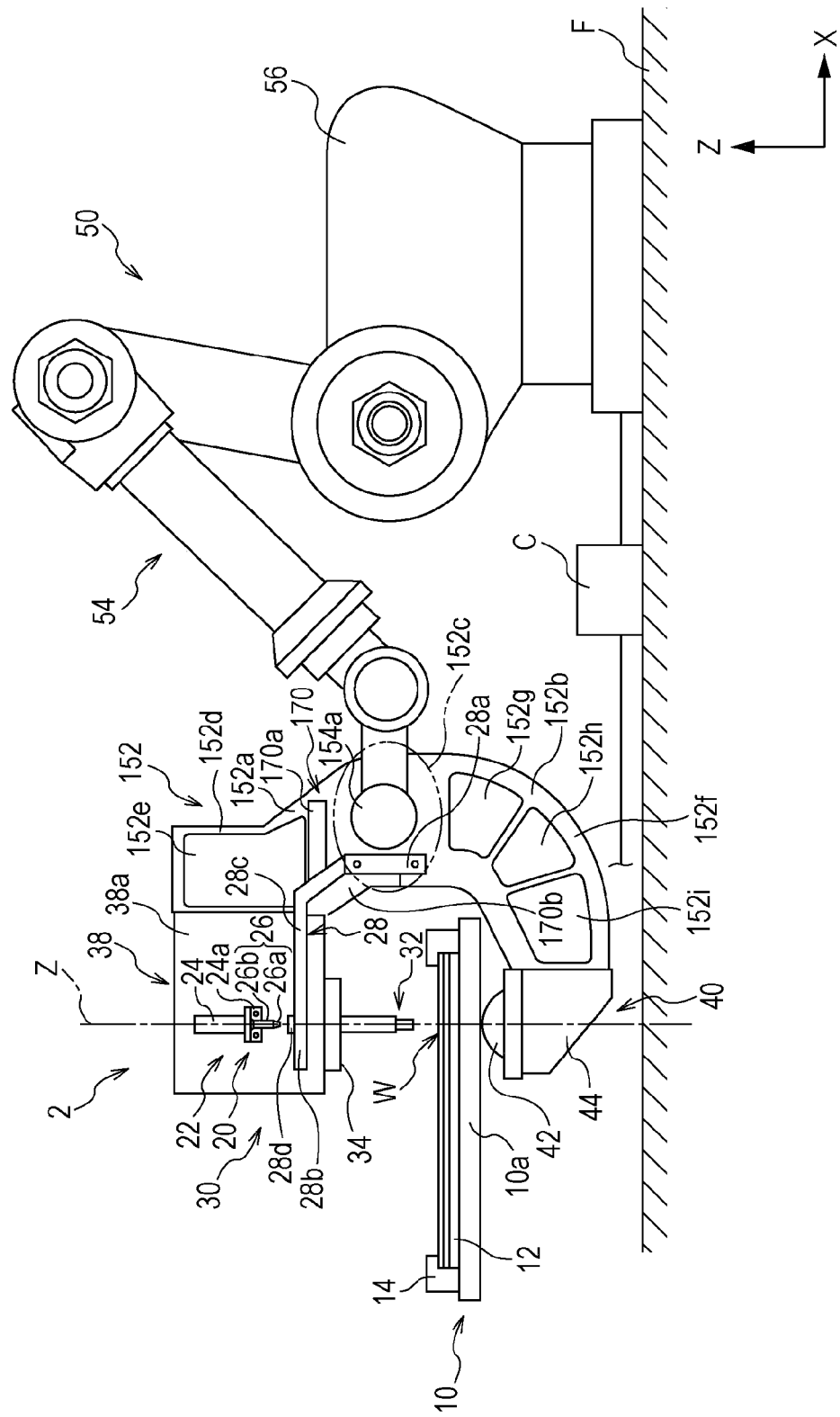

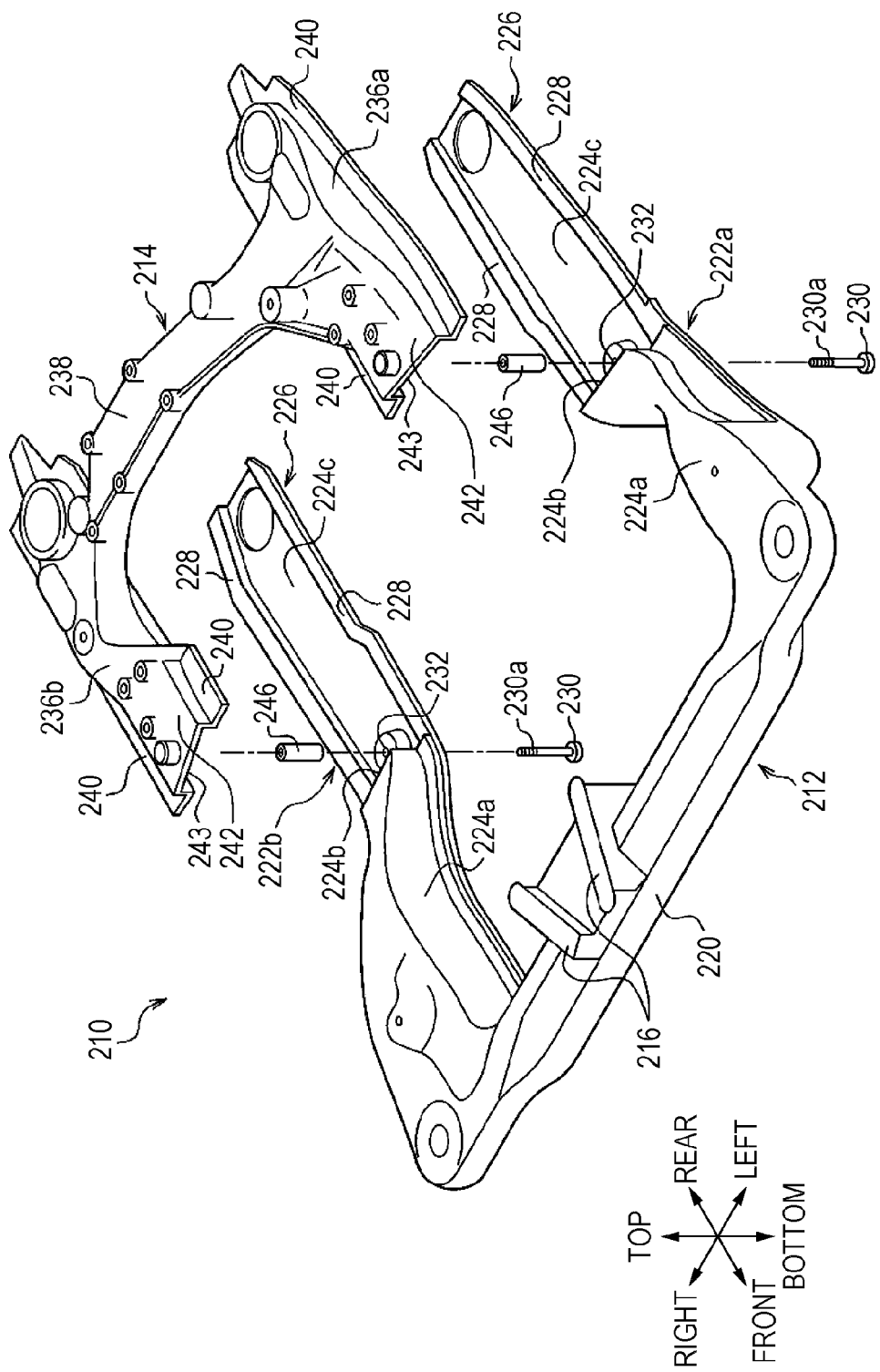

VEHICLE STRUCTURE

CROSS REFERENCES TO RELATED APPLICATIONS

The present application claims priority under 35 U.S.C. §119 to Japanese Patent Application No. 2013-042419, filed Mar. 4, 2013, entitled "Vehicle Structure." The contents of this application are incorporated herein by reference in their entirety.

TECHNICAL FIELD

The present disclosure relates to a vehicle structure formed by welding a flange of a steel plate-like member and a flange of an aluminum member.

BACKGROUND

Japanese Unexamined Patent Application Publication No. 2006-347348 discloses a structure in which a simple configuration and increased strength are implemented even if a die-cast box member and a lid member are welded to each other. In this publication, a flange of the die-cast box member and a flange of the lid member are welded to each other by utilizing friction stir welding.

SUMMARY

After diligent study, the inventors found the following. When welding a flange of a steel plate-like member and a flange of an aluminum member, which are made of dissimilar materials, by utilizing friction stir welding, a corner of the aluminum member positioned near its flange may abut against the flange of the steel plate-like member, which may deform the flange of the steel plate-like member.

It is thus desirable to provide a vehicle structure in which, when welding a flange of a steel plate-like member and a flange of an aluminum member, it is possible to prevent a corner of the aluminum member from abutting against the flange of the steel plate-like member.

According to an aspect of an embodiment of the present disclosure, there is provided a vehicle structure including an steel plate-like member and an aluminum member. The steel plate-like member includes a first vertical wall and a first flange disposed continuously from the first vertical wall via a first bent portion therebetween. The aluminum member is disposed above the steel member and includes a second vertical wall and a second flange disposed continuously from the second vertical wall. The second flange of the aluminum member is disposed above the first flange of the steel member and joined to each other. The second flange includes a plane portion above the first flange, the plane portion extending toward the first vertical wall. The first bent portion includes a base point on the first flange side thereof, the base point being a point at which a bent shape of the first bent portion starts. The plane portion of the second flange covers the steel member at least up to the base potion.

According to this aspect, the plane portion of the aluminum member covers an area up to the base point of the steel plate-like member, but does not cover beyond the base point. In this aspect, therefore, a corner of the aluminum member can be effectively prevented from abutting against the flange of the steel plate-like member. As a result, it is possible to prevent a deformation of the flange of the steel plate-like member, which would otherwise occur as a result of the corner provided near the flange of the aluminum member abutting against the flange of the steel plate-like member.

In the above-described vehicle structure, friction stir welding is performed on the aluminum member toward the steel member in a state in which a sealing member is interposed between the first flange and the second flange to provide a welded joint portion. In this structure, the following equation is satisfied:

$$S1 > S2$$

wherein (S1) is a distance between an axis (T1) of the first vertical wall of the steel member and a vertical center line (C) of the welded joint portion, and (S2) is a distance between an axis (T2) of the second vertical wall of the aluminum member and the center line (C) of the welded joint portion.

With the above-described configuration, the distance S1 is set to be greater than the distance S2. Accordingly, a sealing member interposed between the flange of the steel plate-like member and the flange of the aluminum member can be held on the top surface of the bent portion of the steel plate-like member provided as the lower layer due to the difference between the distances S1 and S2. As a result, the sealing member can be effectively prevented from dropping.

In the above-described vehicle structure, a second bent portion may be formed between the flange and the vertical wall of the aluminum member. In this structure, the following equation is satisfied:

$$R1 > R2$$

wherein R1 is a radius of curvature of an outer circumference of the first bent portion of the steel member, and R2 is a radius of curvature of an outer circumference of the second bent portion of the aluminum member.

With the above-described configuration, the sealing member interposed between the flanges can be easily held on the top surface of the bent portion having the larger radius of curvature R1 of the steel plate-like member positioned on the lower layer. As a result, the sealing member can be more effectively prevented from dropping.

BRIEF DESCRIPTION OF THE DRAWINGS

The advantages of the disclosure will become apparent in the following description taken in conjunction with the following drawings.

FIG. 2 is a side view of the friction stir welding apparatus shown in FIG. 1;

FIG. 7 is an exploded perspective view of a sub-frame structure manufactured by friction stir welding;

DETAILED DESCRIPTION

Figure 1:
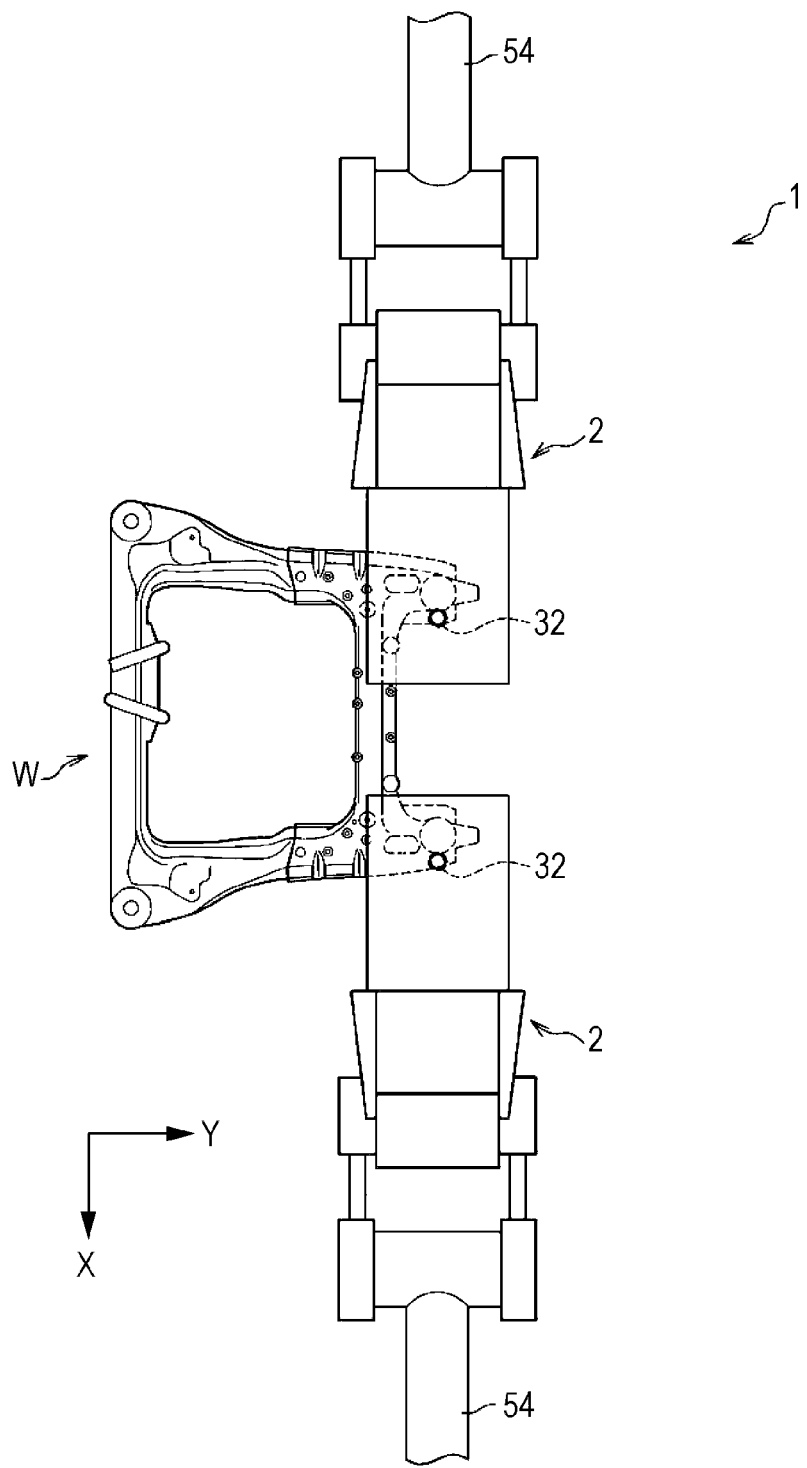
FIG. 1 is a plan view of a friction stir welding system including friction stir welding apparatuses for performing friction stir welding according to an embodiment of the present disclosure.
Figure 3A:
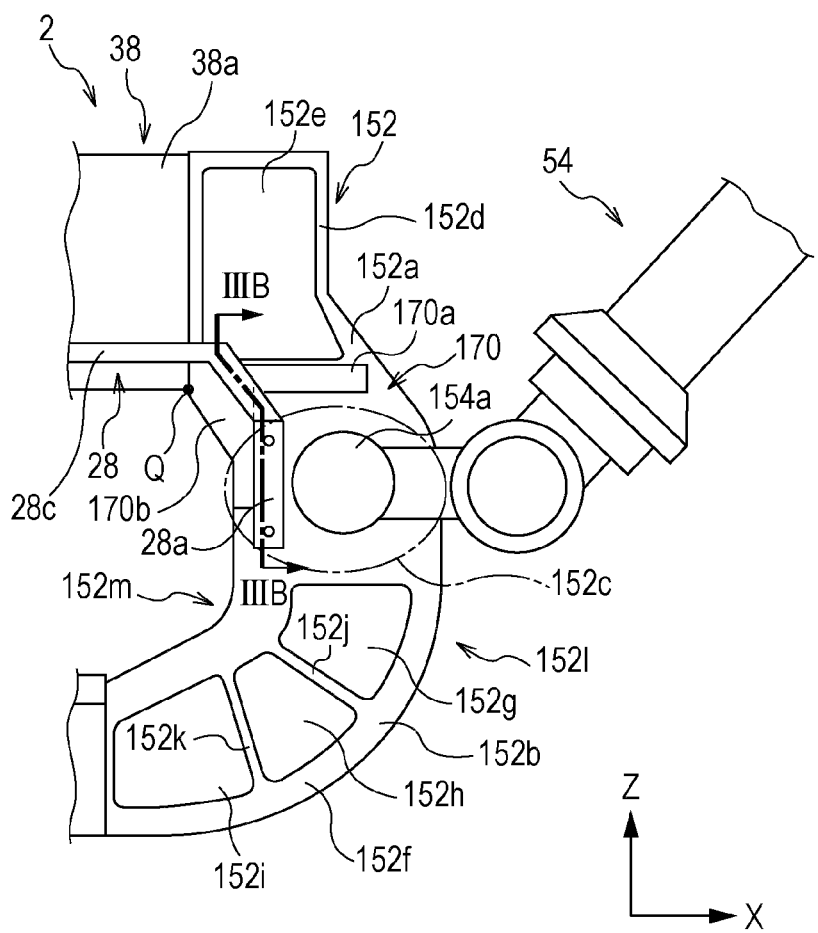
FIGS. 3A and 3B are respectively a partially enlarged side view of the friction stir welding apparatus shown in FIG. 2 and a sectional view taken along line IIIB-IIIB of FIG. 3A.
Figure 3B:
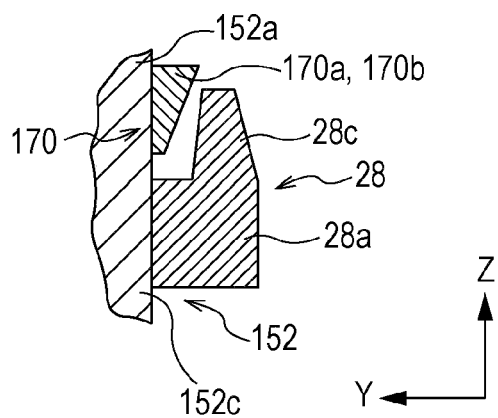
Figure 4A:
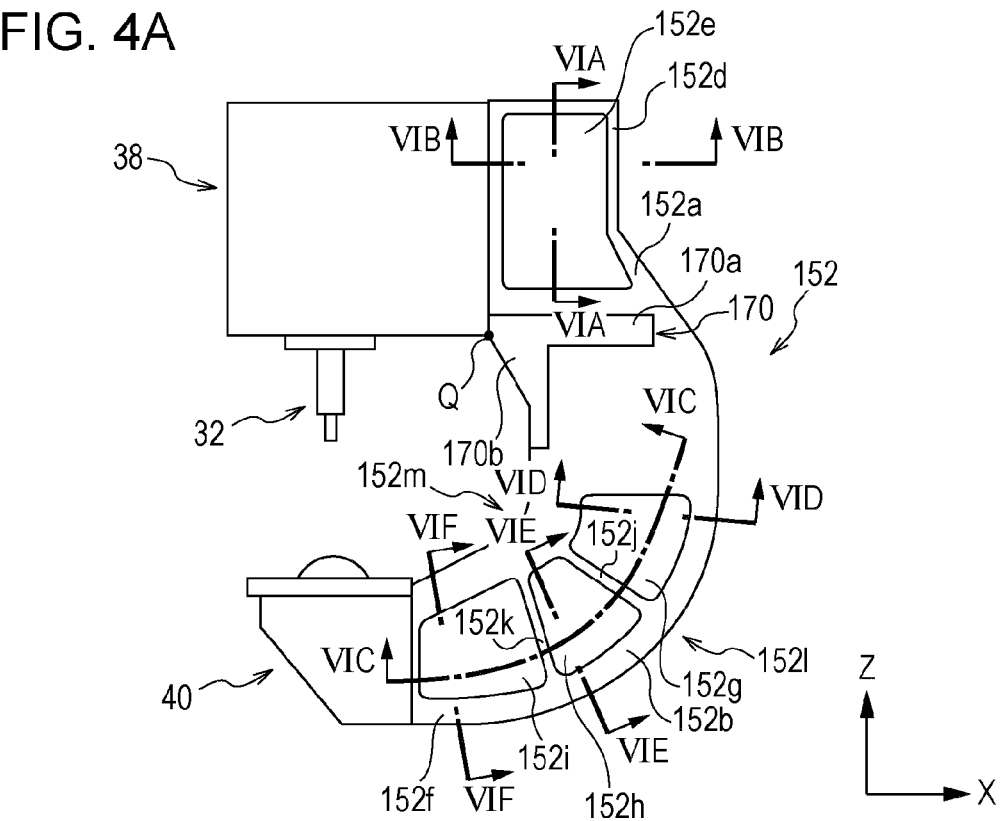
FIG. 4A is an enlarged view of a mounting jig, a drive mechanism, and an auxiliary support mechanism forming the friction stir welding apparatus shown in FIG. 2.
Figure 4B:
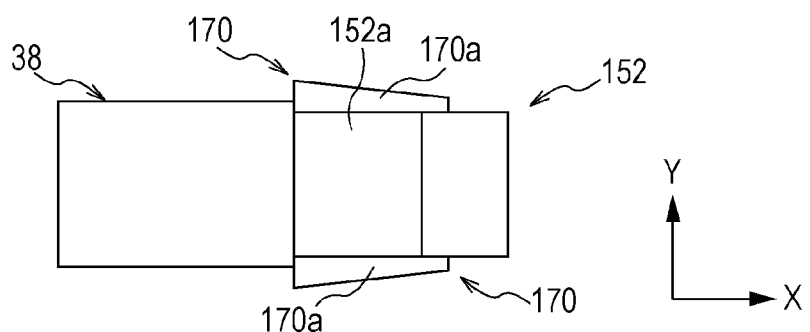
FIG. 4B is a plan view of the friction stir welding apparatus shown in FIG. 4A, as viewed in the direction of the negative side of the Z axis.
Figure 4C:
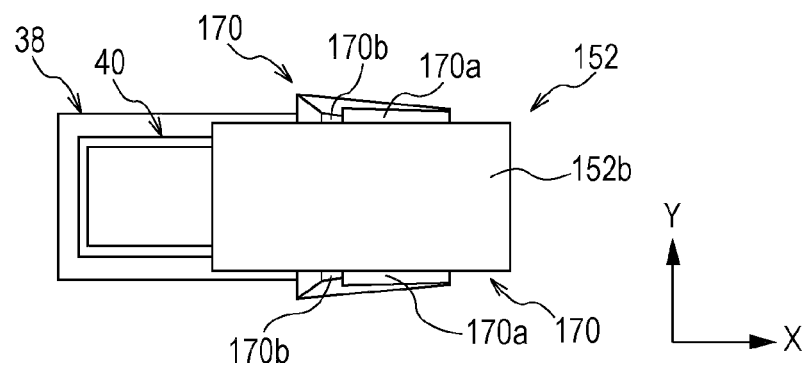
FIG. 4C is a bottom view of the friction stir welding apparatus shown in FIG. 4A, as viewed in the direction of the positive side of the Z axis.
Figure 5A:
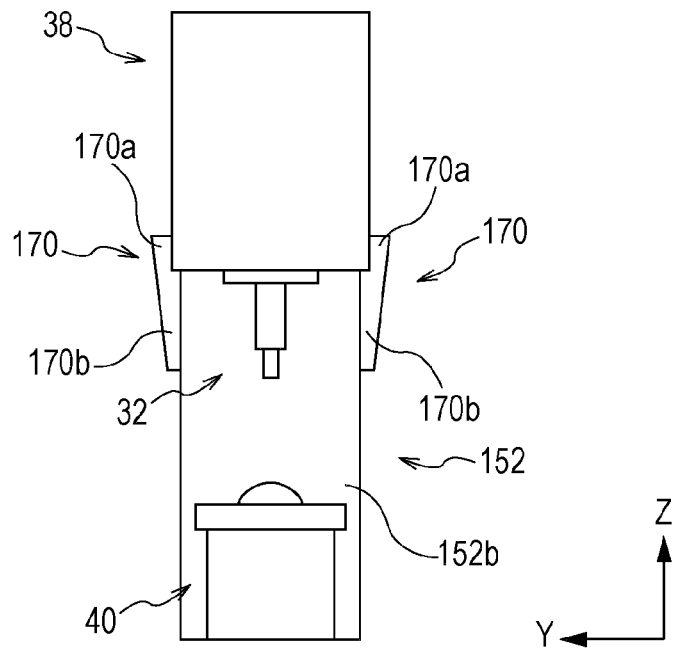
FIG. 5A is a front view of the friction stir welding apparatus shown in FIG. 4A, as viewed in the direction of the positive side of the X axis.
Figure 5B:
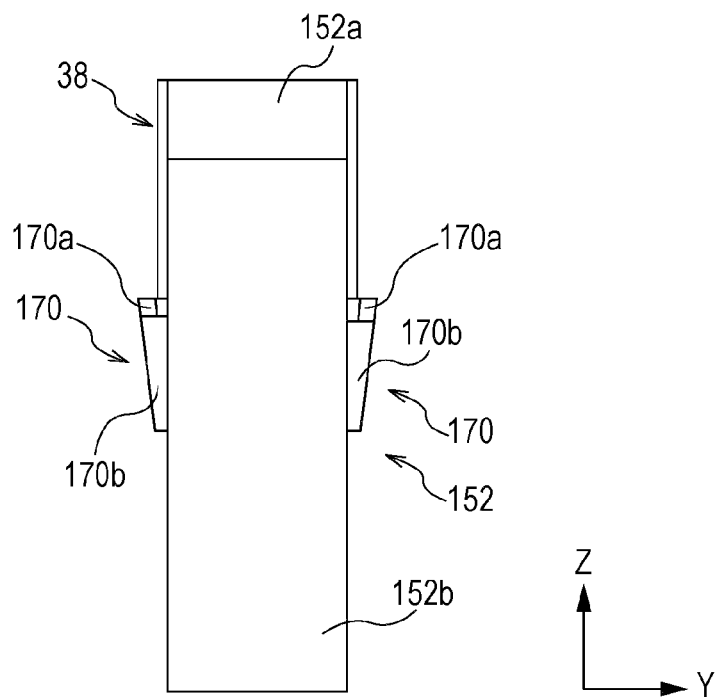
FIG. 5B is a rear view of the friction stir welding apparatus shown in FIG. 4A, as viewed in the direction of the negative side of the X axis.
Figure 6A:
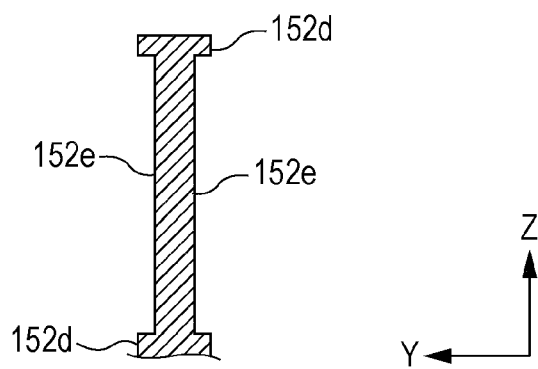
FIG. 6A is a sectional view taken along line VIA-VIA of FIG. 4A.
Figure 6B:
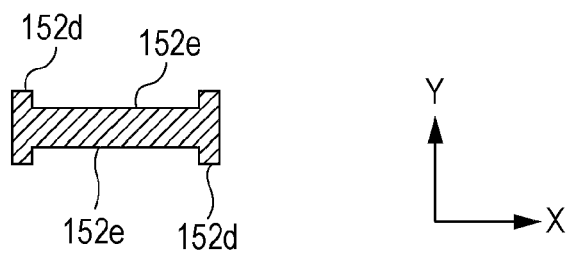
FIG. 6B is a sectional view taken along line VIB-VIB of FIG. 4A.
Figure 6C:
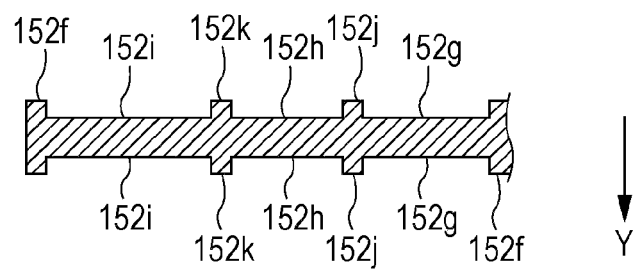
FIG. 6C is a sectional view taken along line VIC-VIC of FIG. 4A.
Figure 6D:
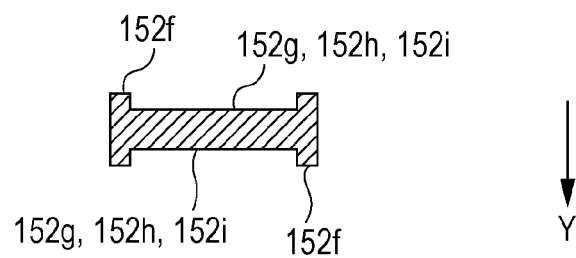
FIG. 6D is a sectional view taken along line VID-VID of FIG. 4A.

An embodiment of the present disclosure will be described below in detail with reference to the accompanying drawings. FIG. 1 is a plan view of a friction stir welding system 1 including friction stir welding apparatuses 2 for manufacturing a vehicle structure according to an embodiment of the present disclosure. FIG. 2 is a side view of the friction stir welding apparatus 2 shown in FIG. 1. FIG. 3A is a side view of a partially enlarged portion of the friction stir welding apparatus 2 shown in FIG. 2. FIG. 3B is a sectional view taken along line IIIB-IIIB of FIG. 3A. FIG. 4A is an enlarged view of a mounting jig, a drive mechanism, and an auxiliary support mechanism forming the friction stir welding apparatus 2 shown in FIG. 2. FIG. 4B is a plan view of the friction stir welding apparatus 2 shown in FIG. 4A, as viewed in the direction of the negative side of the Z axis. FIG. 4C is a bottom view of the friction stir welding apparatus 2 shown in FIG. 4A, as viewed in the direction of the positive side of the Z axis. FIG. 5A is a front view of the friction stir welding apparatus 2 shown in FIG. 4A, as viewed in the direction of the positive side of the X axis. FIG. 5B is a rear view of the friction stir welding apparatus 2 shown in FIG. 4A, as viewed in the direction of the negative side of the X axis. FIG. 6A is a sectional view taken along line VIA-VIA of FIG. 4A. FIG. 6B is a sectional view taken along line VIB-VIB of FIG. 4A. FIG. 6C is a sectional view taken along line VIC-VIC of FIG. 4A. FIG. 6D is a sectional view taken along line VID-VID of FIG. 4A. In FIGS. 2 through 6D, the X, Y, and Z axes form a three-axis rectangular coordinate system. The plane formed by the X and Y axes is a plane parallel to a horizontal plane, and the positive direction of the Z axis is the upward direction.

As shown in FIG. 1, the friction stir welding system 1 includes a pair of friction stir welding apparatuses 2 which are disposed such that they oppose each other with respect to a work W which will be subjected to friction stir welding. The two friction stir welding apparatuses 2 have the same configuration, and thus, one friction stir welding apparatus 2 will be described in detail while omitting an explanation of the other friction stir welding apparatus 2.

As shown in FIG. 2, the friction stir welding apparatus 2 performs friction stir welding on a subject formed by superposing dissimilar materials (hereinafter referred to as a "work W"). The friction stir welding apparatus 2 includes a stand 10, a displacement detector 20, a welding tool 30, an auxiliary support mechanism 40, and a robot 50. The stand 10 is fixed to a floor F to place the work W on the stand 10. The displacement detector 20 is freely movable above the stand 10 in the state in which it opposes the stand 10. The welding tool 30 has the displacement detector 20 fixed thereon and is freely movable above the stand 10 in the state in which it opposes the stand 10. The auxiliary support mechanism 40 is freely movable below the stand 10 in the state in which it abuts against the bottom surface of the stand 10. The robot 50 is fixed to the floor F while holding the welding tool 30 and the auxiliary support mechanism 40 by the use of a mounting jig 152. When the mounting jig 152 is deformed while performing friction stir welding, the welding tool 30 fixed to the mounting jig 152 is displaced. In FIG. 2, the stand 10 is shown in a simplified form by omitting part of the stand 10.

The stand 10 includes a placement jig 12 and a stopper 14. The placement jig 12 is used for placing the work W on a table 10a of the stand 10. The stopper 14 is provided on the placement jig 12 and fixes the work W such that the work W is removable. The position of the work W on the placement jig 12 is maintained with high precision by holding part of the work W with the stopper 14. As a drive source for driving the stopper 14, a motor or an air cylinder (neither of which is shown) may be used. Alternatively, the stopper 14 may be driven manually. Details of the work W will be given later.

The displacement detector 20 is typically a contact-type displacement detector, and includes a pair of displacement sensors 22 and a pair of typically metallic reference members 28 which supply a reference position to each of the displacement sensors 22 when the displacement sensors 22 detects a displacement. The displacement sensors 22 each includes a sensor body 24 and a movable portion 26. The movable portion 26 includes a contact 26a which communicates with the sensor body 24 and a bellows 26b which receives the contact 26a therein and covers the contact 26a, except for the end portion thereof.

The contact 26a is fixed to the sensor body 24 such that an urging force urging the sensor body 24 downward is applied to the contact 26a by using an urging member, such as a coil spring (not shown).

Each of the displacement sensors 22 can freely detect a displacement of a probe 32 of the welding tool 30 which is caused by a deformation of the mounting jig 152, in accordance with a distance by which the contact 26a moves in the state in which the bottom end of the contact 26a abuts against the associated reference member 28. More specifically, each of the displacement sensors 22 detects a displacement of the probe 32 in accordance with a distance by which the contact 26a moves upward while being pressed into the sensor body 24 by the reference member 28 by resisting an urging force or in accordance with a distance by which the contact 26a moves downward while being pushed back from the sensor body 24 by an urging force though it attempts to separate from the reference member 28.

The welding tool 30 includes the above-described probe (welding probe) 32, a holder 34, and a drive mechanism 38. The probe 32 is typically a vertically extending cylindrical member made of a metal, such as steel. The probe 32 is freely rotatable around the central axis Z, which is parallel with the Z axis, and is also vertically movable. The holder 34 holds the probe 32. The drive mechanism 38 vertically moves the probe 32 held in the holder 34 and also rotates the probe 32 about the central axis Z.

The drive mechanism 38 contains a motor, a shaft, etc. within a housing 38a. The direction of the central axis Z of the probe 32 is a direction in which the rotating probe 32 presses the work W when performing friction stir welding.

The welding tool 30 including the probe 32 is attached to the tip end of an arm 54 of the robot 50 which is movable in accordance with the three-axis rectangular coordinate system, thereby facilitating the operation of the probe 32 when performing friction stir welding. As a result, it is possible to efficiently perform friction stir welding on a pair of flanges 240 (see FIG. 8) disposed substantially in parallel with each other with a protruding portion 242 (see FIG. 8) of the work W therebetween.

The housing 38a also serves as a frame member fixed to the mounting jig 152 while supporting the various components, and has, for example, a hollow rectangular parallelepiped shape. The displacement sensors 22 are fixed at the sensor bodies 24 through the use of fixing members 24a to a vertical wall of the housing 28a on the positive side and a vertical wall of the housing 28a of the negative side of the Y axis. The two vertical walls are positioned symmetrically with respect to the central axis Z of the probe 32. Accordingly, the displacement sensors 22 or their contacts 26a are also positioned symmetrically with respect to the central axis Z of the probe 32, and also, the contacts 26a are freely movable vertically along a movement axis which coincides with the central axis Z of the probe 32, as viewed in the direction of the Y axis. Accordingly, the displacement detector 20 can highly precisely detect a displacement of the probe 32 which is caused by a deformation of the mounting jig 152.

In the welding tool 30, when the drive mechanism 38 drives the holder 34 holding the probe 32 downward, the bottom portion of the probe 32 is pressed into the work W and passes through an aluminum material on the upper layer of the work W to reach a steel plate-like member of the lower layer of the work W.

The auxiliary support mechanism 40 includes an auxiliary support member 42 and a holder 44. The auxiliary support member 42 is typically a ball member made of a metal, such as steel, and abuts against the bottom surface of the table 10a on the side opposite to the side of the placement jig 12. The holder 44 rotatably holds the auxiliary support member 42 while making the center position of the auxiliary support member 42 unmovable. In the auxiliary support mechanism 40, in the state in which the auxiliary support member 42 opposes the bottom portion of the probe 32 with the work W therebetween, the auxiliary support member 42 supports the stand 10 in an auxiliary manner while abutting against the bottom surface of the table 10a of the stand 10 at one point of the upper portion of the auxiliary support member 42.

The robot 50 is a movement mechanism which can relatively move the welding tool 30 and the work W, which is a subject to be welded, fixed on the placement jig 12 of the stand 10. The robot 50 is typically an industrial robot. More specifically, the robot 50 includes the above-described mounting jig 152, the above-described arm 54, and a robot body 56. The mounting jig 152 is typically a product which has been cut from a steel material and has a forked shape, as viewed from the lateral side. The mounting jig 152 has an upper mounting portion 152a and a lower mounting portion 152b fixed to the welding tool 30 and the auxiliary support mechanism 40, respectively. The arm 54 is typically an articulated manipulator having the mounting jig 152 fixed thereto.

The robot body 56 contains a drive mechanism for moving the arm 54, an arithmetic unit, a memory, etc. (none of which are shown).

The housing 38a of the drive mechanism 38 of the welding tool 30 is attached to the upper mounting portion 152a of the mounting jig 152, while the holder 44 of the auxiliary support mechanism 40 is attached to the lower mounting portion 152b of the mounting jig 152. A fixed portion 152c, which serves as a coupling portion for coupling the upper mounting portion 152a and the lower mounting portion 152b of the mounting jig 152, is fixed to a support portion 154a, which is one end of the arm 54, through the use of a fastening unit. The robot body 56 communicates with the other end of the arm 54. The drive mechanism of the robot body 56 is started so as to move the arm 54, and in accordance with the movement of the arm 54, the welding tool 30 and the auxiliary support mechanism 40 can be freely moved with a multiple degree of freedom, for example, in the top, bottom, right, and left directions, while maintaining a relative positional relationship between the welding tool 30 and the auxiliary support mechanism 40.

In the friction stir welding operation, the drive mechanism of the robot body 56 moves the arm 54 so as to cause the probe 32 of the welding tool 30 fixed to the upper mounting portion 152a of the mounting tool 152 to press the work W. In this case, the stiffness of the mounting jig 152, in particular, the stiffness of the upper mounting portion 152a for connecting the welding tool 30 and the arm 54 is set to be lower than the stiffness of the arm 54. Accordingly, during the friction stir welding operation, only the upper mounting portion 152a is deformed. In other words, by providing a specific deforming portion, that is, the upper mounting portion 152a, it is substantially sufficient for detection of a displacement of the probe 32 to consider only a deformation of the upper mounting portion 152a during the friction stir welding operation.

A first end 28a of the reference member 28 is fastened to each of the vertical walls (planes parallel with the X-Z plane) of the fixed portion 152c of the mounting jig 152 on the positive side and the negative side of the Y axis. In the friction stir welding operation performed by the friction stir welding apparatus 2, the stiffness of the portion fixed by the fixed portion 152c of the mounting jig 152 is set to be equal to that of the arm 54. Each of the reference members 28 also includes a second end 28b and an extending portion 28c which extends between the first and second ends 28a and 28b to connect them. The reference members 28 are arranged for both of the housing 38a and the mounting jig 152 in association with the positive side and the negative side of the Y axis. More specifically, in the reference member 28 provided on the positive side of the Y axis, the bottom end of the contact 26a of the displacement sensor 22 provided on the positive side of the Y axis freely abuts against the top surface of a receiving member 28d fixed on the second end 28b, and the extending portion 28c extends while being separated from the vertical wall of the mounting jig 152 on the positive side of the Y axis without being constrained. Similarly, in the reference member 28 provided on the negative side of the Y axis, the bottom end of the contact 26a of the displacement sensor 22 provided on the negative side of the Y axis freely abuts against the top surface of a receiving member 28d fixed on the second end 28b, and the extending portion 28c extends while being separated from the vertical wall of the mounting jig 152 on the negative side of the Y axis without being constrained. That is, the displacement sensor 22 and the reference member 28 provided on the positive side of the Y axis form a pair, and the displacement sensor 22 and the reference member 28 provided on the negative side of the Y axis form another pair, and thus, the displacement detector 20 can detect displacements of the probe 32 at two portions by using the two pairs. If the extending portions 28c of the reference members 28 are interconnected with typically a metallic connecting member (not shown) having sufficient stiffness and strength levels, the connection strength of the reference members 28 is increased, thereby enhancing the strength and the stiffness of the entire reference members 28.

The various components forming the friction stir welding apparatus 2 are appropriately controlled in response to control signals sent from a controller C so that they can be operated to perform friction stir welding on the work W. More specifically, the controller C performs control so that the welding tool 30 can move down to cause the probe 32 to be pressed into the work W and also to rotate to stir the work W while generating frictional heat in the work W. The controller C also performs control so that the probe 32 and the work W can relatively move by using the arm 54 of the robot 50 while detecting a distance by which the contact 26a of each of the displacement sensors 22 moves while abutting against the associated reference member 28, thereby performing friction stir welding on the work W along a predetermined joint line. Each of the contacts 26a is vertically movable along the movement axis which coincides with the central axis Z of the probe 32, as viewed along the direction of the Y axis. Accordingly, during the friction stir welding operation, the contact 26a vertically moves while abutting against the associated reference member 28, and thus, a vertical displacement of the probe 32 caused by a deformation of the mounting jig 152, in particular, a deformation of the upper mounting portion 152a, can be detected with high precision. At the same time, the two pairs of the contacts 26a and the associated receiving members 28d are disposed symmetrically with respect to the central axis Z of the probe 32. Thus, vertical displacements of the probe 32 can be detected at two positions close to the probe 32 at which the pairs of the contacts 26a and the receiving members 28d are disposed, and as a result, the detected vertical displacements can be easily calculated. The controller C contains an arithmetic unit, a memory, etc. (none of which are shown), and a control program for performing friction stir welding, data concerning predetermined working directions, etc. are stored in the memory.

On vertical walls 152d of the upper mounting portion 152a provided on the positive side and the negative side of the Y axis, upper recessed portions 152e formed by cutting the vertical walls 152d while leaving the peripheral portions thereof as wall portions are provided. With this configuration, the upper mounting portion 152a is reduced in weight without sacrificing the strength and the stiffness thereof.

Similarly, on vertical walls 152f of the lower mounting portion 152b provided on the positive side and the negative side of the Y axis, first lower recessed portions 152g, second lower recessed portions 152h, and third lower recessed portions 152i formed by cutting the vertical walls 152b while leaving the peripheral portions thereof as wall portions are sequentially provided from the top to the bottom side. With this configuration, the lower mounting portion 152b is reduced in weight without sacrificing the strength and the stiffness thereof.

In order to maintain the strength and the stiffness of the lower mounting portion 152b, a first rib 152j (see FIG. 3A) which is flush with the vertical wall 152f on the positive side of the Y axis is provided between the first lower recessed portion 152g and the second lower recessed portion 152h of the lower mounting portion 152b on the positive side of the Y axis, and also, a first rib 152j which is flush with the vertical wall 152f on the negative side of the Y axis is provided between the first lower recessed portion 152g and the second lower recessed portion 152h of the lower mounting portion 152b on the negative side of the Y axis. Similarly, a second rib 152k (see FIG. 3A) which is flush with the vertical wall 152f on the positive side of the Y axis is provided between the second lower recessed portion 152h and the third lower recessed portion 152i of the lower mounting portion 152b on the positive side of the Y axis, and also, a second rib 152k which is flush with the vertical wall 152f on the negative side of the Y axis is provided between the second lower recessed portion 152h and the third lower recessed portion 152i of the lower mounting portion 152b on the negative side of the Y axis.

The peripheral edge of the lower mounting portion 152b on the positive side of the X axis has a single arc shape, and the peripheral edge of the lower mounting portion 152b on the negative side of the X axis has a smooth shape by connecting two intersecting straight lines with an arc so that an unnecessary corner may not be generated. With this configuration, the generation of unnecessary stress concentration on the lower mounting portion 152b is suppressed. In this case, in order to maintain the balance of the strength of the lower mounting portion 152b, the first rib 152j and the second rib 152k extend in the radial direction of the single arc formed on the peripheral edge of the lower mounting portion 152b on the positive side of the X axis. The peripheral edge of the lower mounting portion 152b on the negative side of the X axis has a single arc shape, thereby suppressing the generation of unnecessary stress concentration on the lower mounting portion 152b.

A reinforcing member 170 is provided from the upper mounting portion 152a to the fixed portion 152c. The reinforcing member 170 is fixed between the welding tool 30 and the fixed portion 152c such that it projects from the vertical wall (plane parallel with the X-Z plane) of the mounting jig 152 on the negative side of the Y axis toward the negative side of the Y axis. The reinforcing member 170 includes a body 170a and an extending portion 170b extending downward from the body 170a.

More specifically, the body 170a of the reinforcing member 170 has a vertical length to vertically stretch down over a front bottom end Q (extending perpendicular to the X-Z plane) of the upper mounting portion 152a, which is a high stress portion, in the vertical wall 152d of the upper mounting portion 152a on the negative side of the Y axis, while projecting from the vertical wall 152d of the upper mounting portion 152a on the negative side of the Y axis toward the negative side of the Y axis. The body 170a of the reinforcing member 170 also extends from the peripheral edge of the upper mounting portion 152a on the negative side of the X axis to the positive side of the X axis, thereby relaxing the stress of the upper mounting portion 152a.

The extending portion 170b of the reinforcing member 170 extends downward from the body 170a such that it enters the fixed portion 152c, which is a high stiffness portion, while projecting from the vertical wall 152d of the upper mounting portion 152a on the negative side of the Y axis toward the negative side of the Y axis, thereby relaxing the stress of the upper mounting portion 152a.

Figure 8:
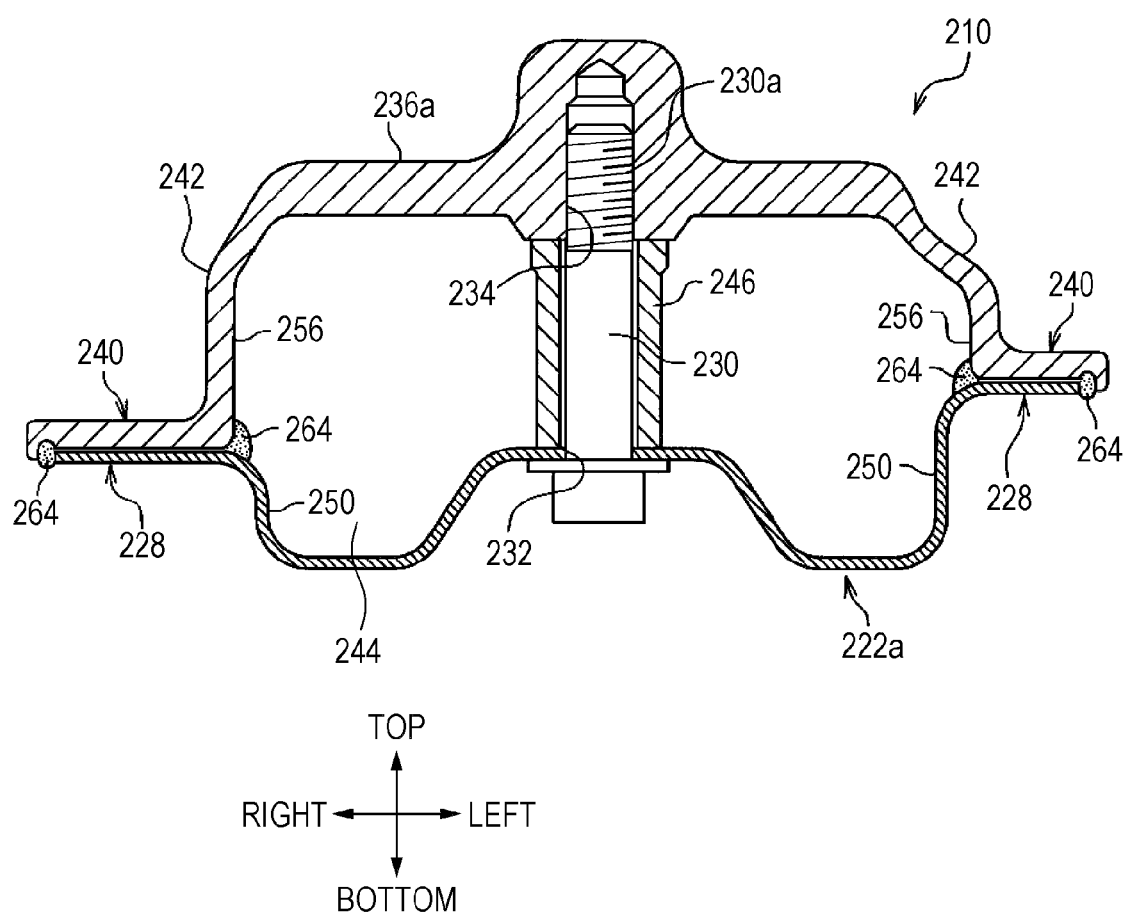
FIG. 8 is a vertical sectional view of a superposed portion of a front sub frame and a rear sub frame in the sub-frame structure.

The work W will be described below with reference to FIGS. 7 and 8. FIG. 7 is an exploded perspective view of a sub-frame structure manufactured by friction stir welding. FIG. 8 is a vertical sectional view of a superposed portion of a front sub frame and a rear sub frame in the sub-frame structure. The work W is constituted by a front sub frame (steel plate-like member) 212 and a rear sub frame (aluminum member) 214 (see FIG. 7), and is formed by superposing the steel plate-like member and the aluminum member. By performing friction stir welding on the work W, a sub-frame structure (vehicle structure) 210, which is a vehicle suspension support member arranged in a double cross, is manufactured.

The sub-frame structure 210 is provided such that it is fixed to a vehicle member (skeleton member) (not shown) disposed on the front side of a vehicle, or such that it is floatably supported by a floating mechanism (not shown). If the sub-frame structure 210 is supported by a floating mechanism (not shown), vibration transmitted from a vehicle body can be appropriately absorbed.

As shown in FIG. 7, the sub-frame structure 210 is divided into front and rear portions with respect to the longitudinal direction of the vehicle, and is constituted by the steel front sub frame 212 (steel plate-like member) and the aluminum rear sub frame 214 (aluminum member). The front sub frame 212 and the rear sub frame 214 are formed in a substantially angular U shape as viewed from above. The front sub frame 212 is a press-molded body formed by pressing-molding a steel plate-like member (not shown), and the rear sub frame 214 is a die-cast body formed by solidifying a molten aluminum alloy (aluminum) within a cavity of a die (die-cast machine) (not shown) by means of die-cast molding.

Figure 9:
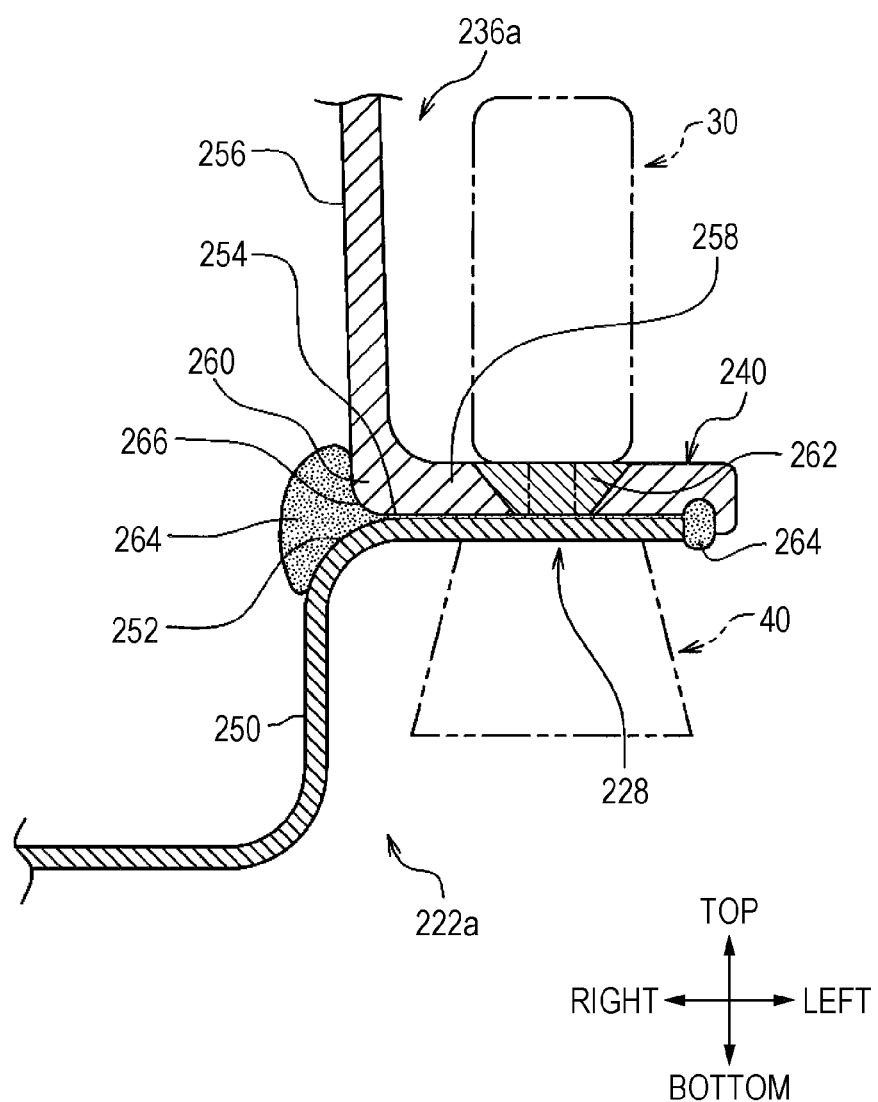
FIG. 9 is an enlarged partial sectional view of the superposed portion of the sub-frame structure shown in FIG. 8.

In FIGS. 7 through 9, "front" and "rear" respectively indicate front and rear sides of a vehicle in the longitudinal direction of the vehicle, and "right" and "left" respectively indicate the right side and the left side of the vehicle in the widthwise direction of the vehicle.

As shown in FIG. 7, the front sub frame 212 includes a front cross member 220 and a pair of left and right side members 222a and 222b. The front cross member 220 supports an engine (not shown) positioned at the front of the vehicle through a front engine mount (not shown) to be mounted on a mounting portion 216, and extends in the widthwise direction of the vehicle. The pair of left and right side members 222a and 222b are coupled to both ends of the front cross member 220 in the axial direction, and extend toward the rear of the vehicle substantially in parallel with each other.

The front cross member 220 and the pair of left and right side members 222a and 222b may be integrally formed by, for example, casting or forging. Alternatively, the front ends of the pair of left and right side members 222a and 222b may be welded to both ends of the front cross member 220 in the axial direction.

The front cross member 220 is formed by using a hollow steel member. Front portions 224a positioned in front of central portions (intermediate portions) 224b in the axial direction of the pair of left and right side members 222a and 222b are formed by using a hollow steel member. The central portions 224b and rear portions 224c positioned in back of the central portions 224b are formed by using thin sheets (sheet-like portions) 226 which are formed thinner than the front portions 224a.

In this case, the thin sheets 226 of the pair of left and right side members 222a and 222b are formed such that they extend (expand) toward the rear longer than known left and right side members by a predetermined length. As shown in FIG. 8, the central portion 224b of each of the left and right side members 222a and 222b and the corresponding thin sheet 226 are formed of one thin sheet in a substantially hat-like shape in a vertical cross section, and a flange 228 extending in the axial direction is formed at each of the left and right edges of each of the left and right side members 222a and 222b (the right side member 222b is not shown in FIG. 8).

Bolt holes 232 into which a pair of bolts 230 are inserted are formed in the central portions 224b disposed along the axial direction of the pair of left and right side members 222a and 222b. In this case, as shown in FIG. 8, the pair of bolts 230 are caused to pass through the bolt holes 232 of the left and right side members 222a and 222b from the bottom side, and threaded screws 230a of the bolts 230 are fastened into closed-end screw holes 234 provided at the front end of the rear sub frame 214. As a result, the front sub frame 212 and the rear sub frame 214 are fixed to each other through the use of the pair of bolts 230 on the left and right sides in the widthwise direction of the vehicle.

The rear sub frame 214 is constituted by a rear member which supports the rear of an engine through a rear engine mount (not shown) and extends in the widthwise direction of the vehicle. The rear member includes a pair of left and right rear side portions 236a and 236b and a rear cross portion 238. The pair of left and right rear side portions 236a and 236b are superposed on the top surfaces of the central portions 224b and the thin sheets 226 positioned in back of the central portions 224b so as to cover part of the top surfaces of the pair of left and right side members 222a and 222b, respectively. The rear cross portion 238 interconnects the pair of left and right rear side portions 236a and 236b. The rear member is preferably formed of a light-metal member, such as aluminum, magnesium, or an alloy thereof.

A pair of flanges 240 are provided on both sides of each of the left and right rear side portions 236a and 236b, and are formed such that they extend from one end to the other end of each of the left and right rear side portions 236a and 236b in the axial direction. In each of the left and right rear side portions 236a and 236b, a protruding portion 242 extending upward is provided between one flange 240 and the other flange 240. By providing the protruding portion 242 between the pair of flanges 240, an opening 243 is formed at the front side of each of the left and right rear side portions 236a and 236b. The pair of flanges 240 are provided at the peripheral edges of the opening 243. In each of the left and right rear side portions 236a and 236b, the pair of flanges 240 extend substantially in parallel with each other while opposing each other, and the protruding portion 242 is formed between the pair of flanges 240 extending substantially in parallel with each other.

In this case, the flanges 228 provided on the left and right sides of each of the left and right side members 222a and 222b are positioned at the lower layer, and the flanges 240 provided on the left and right sides of each of the left and right rear side portions 236a and 236b are provided at the upper layer. The flanges 228 and the flanges 240 are integrally welded to each other by means of friction stir welding in the state in which they are superposed on each other, thereby forming closed cross sections 244 (see FIG. 8).

The left and right side members 222a and 222b are fastened to the left and right rear side portions 236a and 236b, respectively, by screwing the bolts 230 which are inserted into the bolt holes 232 provided at the widthwise central portions 224b into the screw holes 234 provided in the left and right rear side portions 236a and 236b and by causing the bolts 230 to pass through the closed cross sections 244.

Within each of the closed cross sections 244, a collar member 246 is provided. The collar member 246 is formed of a cylindrical member to surround the peripheral surface of the bolt 230 and reinforces the welding strength between the left and right side members 222a and 222b and the left and right rear side portions 236a and 236b, respectively, when the bolt 230 is fastened. The portion at which the bolt 230 is fastened is a portion at which the front sub frame 212 and the rear sub frame 214 are not welded by friction stir welding, and thus, such a portion, which is unable to be welded, can be reinforced by fastening the bolt 230. As a result, when welding the steel front sub frame 212 and the aluminum rear sub frame 214 to each other by means of friction stir welding, desired stiffness and strength levels can be obtained by a cooperative relationship between a friction stir welding operation and a fastening operation for fastening non-welded portions with the bolts 230.

Accordingly, the front sub frame 212 and the rear sub frame 214 are firmly fixed (welded) to each other by welding the superposed flanges 228 and 240 by means of friction stir welding, and also by fastening non-welded portions of the front sub frame 212 and the rear sub frame 214 with the use of the bolts 230, thereby further increasing the stiffness and the strength of the entire sub-frame structure 210.

A description will now be given in detail, with reference to FIGS. 9 through 11, a structure of edges provided on both sides of the left side member 222a provided as the lower layer of the sub-frame structure 210 and edges provided on both sides of the left rear side portion 236a provided as the upper layer of the sub-frame structure 210. Edges provided on left and right sides have the same configuration, and thus, only the edge provided on the left side will be described in detail while omitting an explanation of the edge provided on the right side.

FIG. 9 is an enlarged partial sectional view of the superposed portion of the sub-frame structure 210 shown in FIG. 8. FIG. 10 illustrates the relationship between the distance from the vertical wall of the front sub frame 212 to a joint portion and the distance from the vertical wall of the rear sub frame 214 to the joint portion. FIG. 11 illustrates the radius of curvature of a bent portion and that of a bent portion.

As shown in FIG. 9, one edge of the left side member 222a (steel plate-like member) provided as the lower layer includes the flange 228, a vertical wall 250, a bent portion 252, and a base end section 254. The vertical wall 250 is continuously provided from the inner side of the flange 228 in the widthwise direction of the vehicle and extends downward substantially perpendicular to the flange 228. The bent portion 252 is formed as a result of being bent downward between the flange 228 and the vertical wall 250. The base end section 254 is a start point at which the bent portion 252 starts to be bent from the flange 228.

One edge of the left rear side portion 236a (aluminum member) provided as the upper layer includes the flange 240, a vertical wall 256, a plane section 258, and a bent portion 260. The vertical wall 256 is continuously provided from the inner side of the flange 240 in the widthwise direction of the vehicle and extends upward substantially perpendicular to the flange 240. The plane section 258 is provided on the flange 240 and extends toward the vertical wall 250 of the left side member 222a. The bent section 260 is formed between the flange 240 and the vertical wall 256.

In this embodiment, the plane section 258 of the left rear side portion 236a is provided such that it covers an area substantially up to the base end section 254 of the left side member 222a. With this configuration, in this embodiment, the plane section 258 of the left rear side portion 236a is provided such that, in a region on the inner side of the widthwise direction of the vehicle, it covers an area up to the base end section 254 of the left side member 222a, but does not cover beyond the base end section 254. In this embodiment, therefore, a corner 266 provided on the outer surface of the bent section 260 of the left rear side portion 236a can be effectively prevented from abutting against the flange 228 of the left side member 222a. As a result, it is possible to prevent a deformation of the flange 228 of the left side member 222a, which would otherwise occur as a result of the corner 266 of the flange 240 of the left rear side portion 236a abutting against the flange 228 of the left side member 222a.

Figure 10:
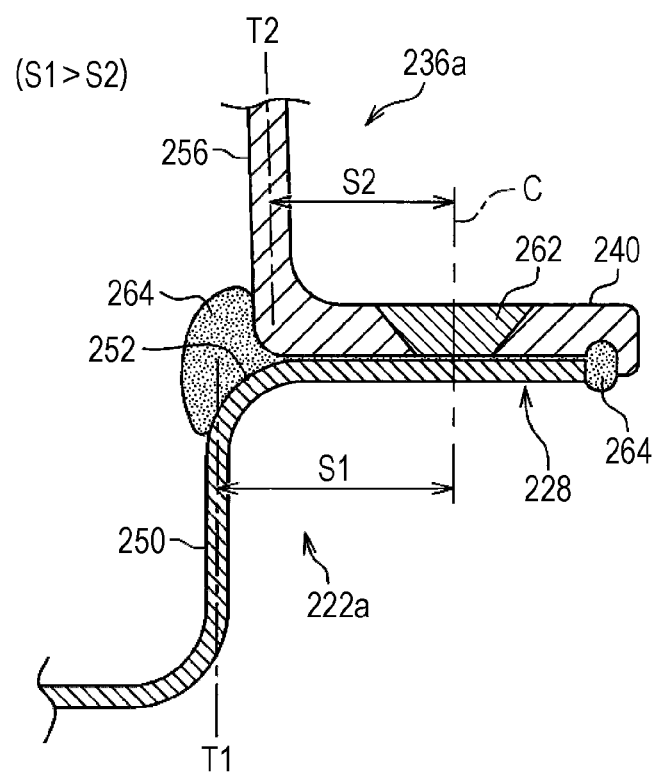
FIG. 10 illustrates the relationship between the distance from the vertical wall of the front sub frame to a joint portion and the distance from the vertical wall of the rear sub frame to the joint portion.

As shown in FIG. 10, the distance S1 between an axis T1 of the vertical wall 250 of the left side member 222a provided as the lower layer and a center line C of a welded joint portion 262 is set to be greater than the distance S2 between an axis T2 of the vertical wall 256 of the left rear side portion 236a provided as the upper layer and the center line C of the welded joint portion 262 (S1>S2).

With this setting, in this embodiment, a sealant (sealing member) 264, which will be discussed later, interposed between the flanges 228 and 240 can be held on the top surface of the bent portion 252 of the left side member 222a provided as the lower layer due to the difference (S1−S2) between the distances S1 and S2. As a result, the sealant 264 can be effectively prevented from dropping.

Figure 11:
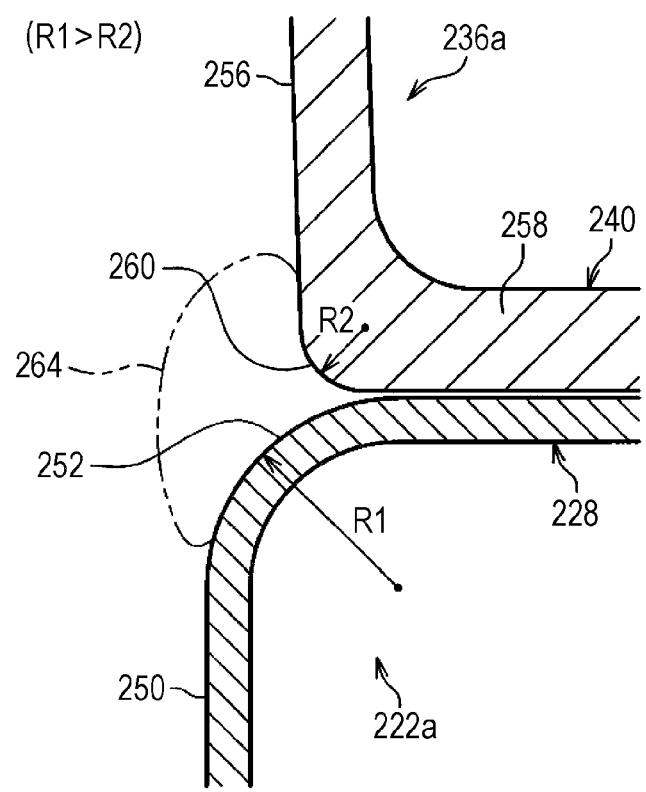
FIG. 11 illustrates the relationship between the radius of curvature of a bent portion and that of a bent section.

As shown in FIG. 11, in this embodiment, the radius of curvature R1 of the outer circumference of the bent portion 252 of the left side member 222a positioned on the lower layer is set to be greater than the radius of curvature R2 of the outer circumference of the bent portion 260 of the left rear side portion 236a provided as the upper layer (R1>R2).

With this setting, in this embodiment, the sealant 264 interposed between the flanges 228 and 240 can be easily held on the top surface of the bent portion 252 having the larger radius of curvature R1 of the left side member 222a provided as the lower layer. As a result, the sealant 264 can be more effectively prevented from dropping.

The friction stir welding apparatus 2 for manufacturing a vehicle structure of this embodiment is basically configured as described above. The operation and advantages of the friction stir welding apparatus 2 will be discussed below.

A description will now be given of a process for integrally welding joint portions, by means of friction stir welding, at which the flanges 228 of the steel front sub frame 212 and the flanges 240 of the aluminum rear sub frame 214 are superposed on each other.

Before starting the friction stir welding process, in the robot 50, the welding tool 30 having the probe 32 is fixed to the upper mounting portion 152a of the mounting jig 152, and the auxiliary support mechanism 40 is fixed to the lower mounting portion 152b of the mounting jig 152.

After setting the front sub frame 212 on the stand 10, the sealant 264 (for example, an air drying sealant) is applied to the top surface of the front sub frame 212 by using a sealant coating mechanism (not shown). After positioning and superposing the rear sub frame 214 on the top surface (the thin sheet 226 in back of the central portion 224b) of the front sub frame 212 coated with the sealant 264, part of the front sub frame 212 and part of the rear sub frame 214 vertically superposed on each other are clamped with the stopper 14.

Then, the flanges 228 of the front sub frame 212 and the flanges 240 of the rear sub frame 214 are subjected to friction stir welding by using the welding tool 30.

Figure 12:
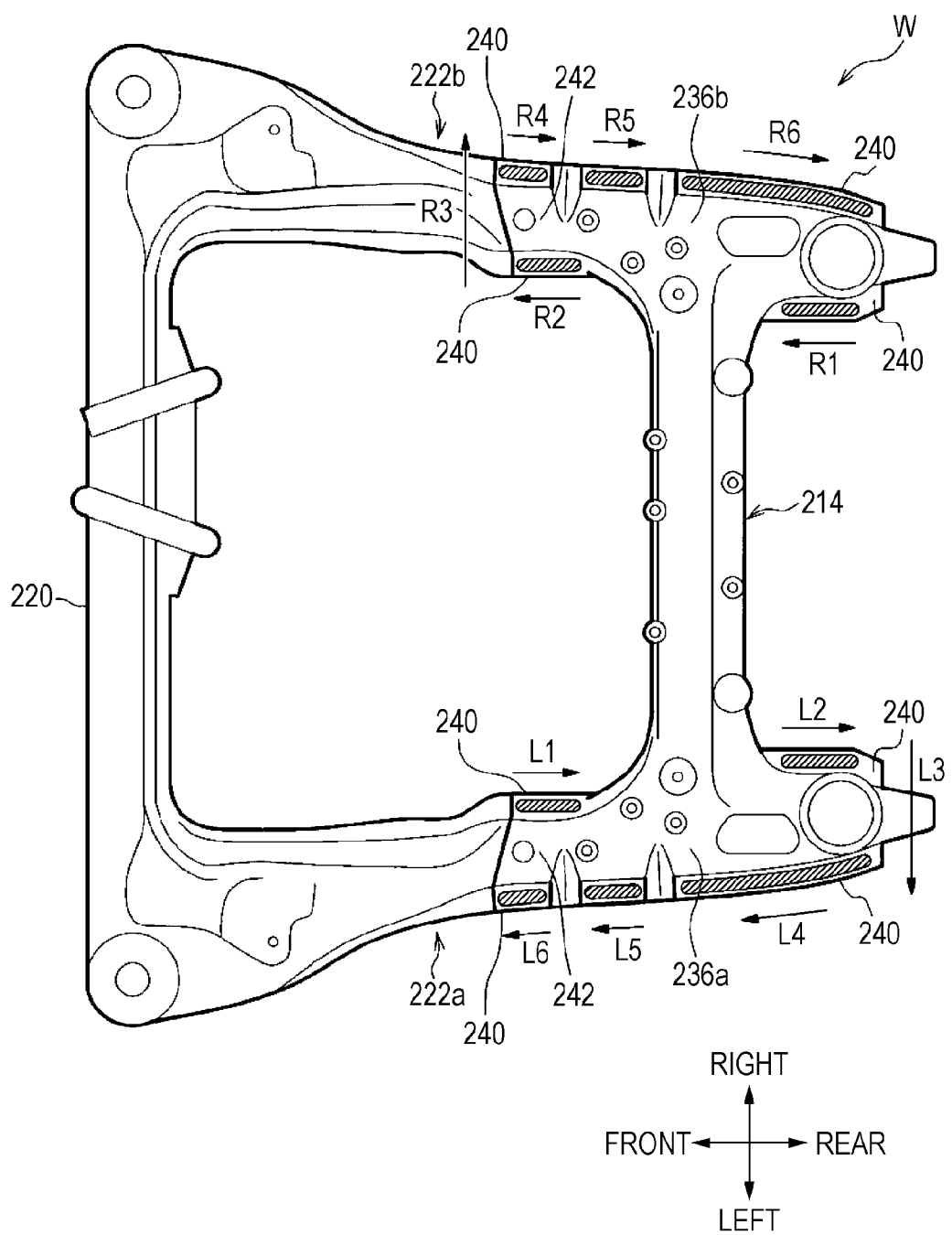
FIG. 12 is a plan view showing welding directions and welding orders of a probe when performing friction stir welding.
Figure 13A:
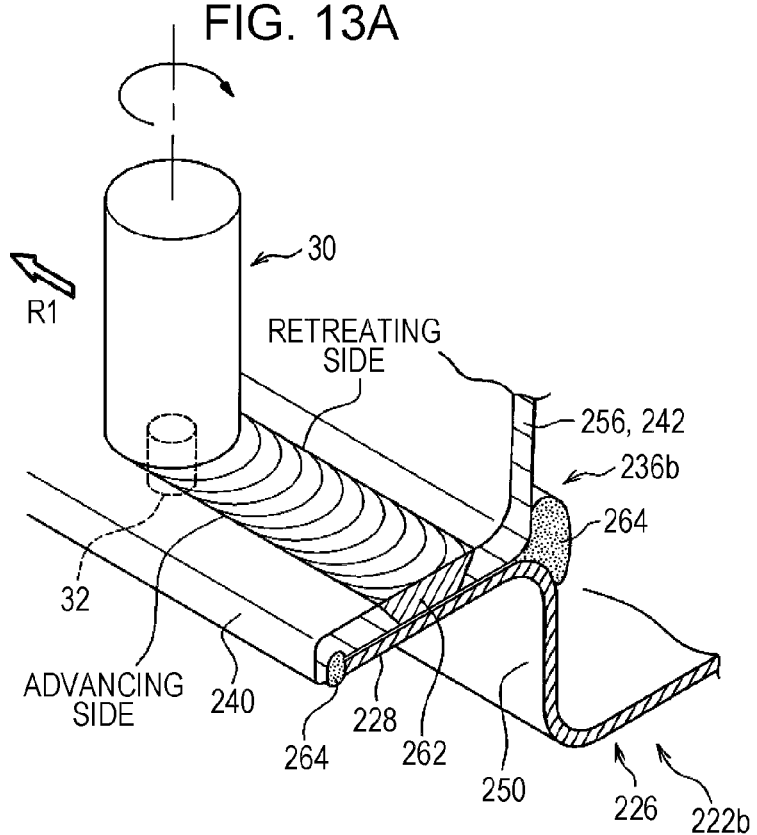
FIGS. 13A and 13B are respectively a partially broken perspective view showing a state in which flanges of a right side member and a right rear side portion are welded by using a probe along the direction indicated by arrow R1, and a partially broken perspective view showing a state in which flanges of a left side member and a left rear side portion are welded by using the probe along the direction indicated by arrow L2.
Figure 13B:
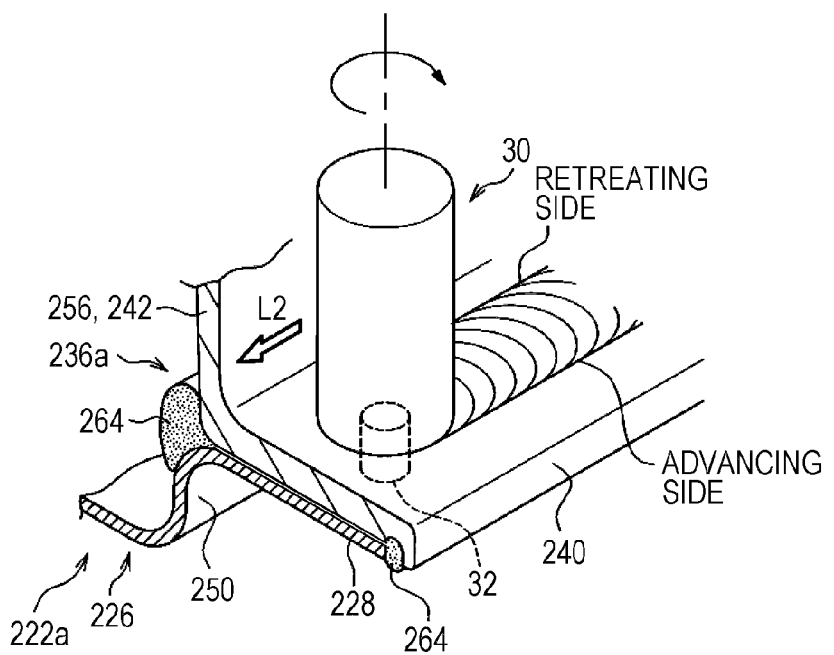

FIG. 12 is a plan view showing welding directions and welding orders of the probe 32 when performing friction stir welding. FIG. 13A is a partially broken perspective view showing a state in which the flanges 228 and 240 of the right side member 222b and the right rear side portion 236b, respectively, are welded by using the probe 32 along the direction indicated by arrow R1. FIG. 13B is a partially broken perspective view showing a state in which the flanges 228 and 240 of the left side member 222a and the left rear side portion 236a, respectively, are welded by using the probe 32 along the direction indicated by arrow L2. In FIG. 12, a plurality of hatched portions indicate welded portions (welded joint portions 262) subjected to friction stir welding by using the probe 32.

By using the friction stir welding apparatus 2 disposed on one side, the flanges 240 of the right rear side portion 236*b* of the rear sub frame 214 and the flanges 228 of the thin sheet 226 of the right side member 222*b* of the front side frame 212 are welded by means of friction stir welding.

More specifically, the friction stir welding apparatus 2 disposed on one side performs friction stir welding in the following manner. In the state in which the probe 32 is rotated clockwise (indicated by the arrow in FIG. 13A) as viewed from above by using the drive mechanism 38, the probe 32 is inserted into the flange 240 of the aluminum rear sub frame 214, thereby starting friction stir welding to weld the flanges 240 and 228 positioned on the inner side of the rear side of the vehicle. The probe 32 is sequentially moved along the direction of arrow R1→arrow R2 (predetermined direction) (see FIG. 12) by the operation of the arm 54 of the robot 50.

When the probe 32 reaches the end point of the direction indicated by arrow R2, the arm 54 of the robot 50 is displaced so that the probe 32 can cross the protruding portion 242 in the direction indicated by arrow R3 and be inserted into the flange 240 on the outer side. Then, the probe 32 is sequentially moved in the direction of arrow R4→arrow R5→arrow R6, which is opposite to the direction of arrow R1→arrow R2.

At the same time or substantially at the same time as the operation of the friction stir welding apparatus 2 positioned on one side, the friction stir welding apparatus 2 positioned on the other side performs friction stir welding. More specifically, the flanges 240 of the left rear side portion 236*a* of the rear sub frame 214 and the flanges 228 of the thin sheet 226 of the left side member 222*a* of the front side frame 212 are welded by means of friction stir welding.

More specifically, the friction stir welding apparatus 2 disposed on the other side performs friction stir welding in the following manner. In the state in which the probe 32 is rotated clockwise (indicated by the arrow in FIG. 13B) as viewed from above by using the drive mechanism 38, the probe 32 is inserted into the flange 240 of the aluminum rear sub frame 214, thereby starting friction stir welding to weld the flanges 240 and 228 positioned on the inner side of the front side of the vehicle. The probe 32 is sequentially moved along the direction of arrow L1→arrow L2 (predetermined direction) (see FIG. 12) by the operation of the arm 54 of the robot 50.

When the probe 32 reaches the end point of the direction indicated by arrow L2, the arm 54 of the robot 50 is displaced so that the probe 32 can cross the protruding portion 242 in the direction indicated by arrow L3 and be inserted into the flange 240 on the outer side. Then, the probe 32 is sequentially moved in the direction of arrow L4→arrow L5→arrow L6, which is opposite to the direction of arrow L1→arrow L2.

In this manner, in this embodiment, by causing the probe 32 of the welding tool 30 to reciprocate on the pair of flanges 240 which are disposed substantially in parallel with each other with the protruding portion 242 therebetween, friction stir welding can be efficiently performed on the pair of flanges 240 while maintaining the same rotation direction of the probe 32.

In this embodiment, since friction stir welding can be started from the right and left sides of the pair of left and right rear side portions 236*a* and 236*b*, the retreating side at which the moving direction of the probe 32 is opposite to the rotation direction of the probe 32 can be set to be the side of the flange 240 close to the protruding portion 242 for which higher stiffness and strength are required (see FIGS. 13A and 13B). In other words, by setting the side of the flange 240 close to the protruding portion 242 as the retreating side, the stiffness and the strength of the side of the flange 240 close to the protruding portion 242 can be increased, compared with those of the other side of the flange 240 without the protruding portion 242. Thus, in this embodiment, desired balanced stiffness and strength can be obtained for the sub frame structure 210. Generally, compared with the advancing side at which the moving direction of the probe 32 coincides with the rotation direction of the probe 32, the region of plastic flow generated by the probe 32 can be increased on the retreating side.

In this embodiment, by causing the probe 32 to reciprocate from a predetermined direction (the direction of arrow R1→arrow R2 or the direction of arrow L1→arrow L2) to the opposite direction (the direction of arrow R4→arrow R5→arrow R6 or the direction of arrow L4→arrow L5→arrow L6) via the protruding portion 242 without changing the rotation direction of the probe 32, both of the flanges 240 on the inner side and the flanges 240 on the outer side of the sub frame structure 210 can be set as the retreating sides, thereby facilitating friction stir welding.

In this embodiment, the plurality of welded joint portions indicated by hatched portions in FIG. 12 are disposed line-symmetrically with each other. Accordingly, even if the welding tool 30 having a so-called C shape is used, the pair of left and right rear side portions 236*a* and 236*b* can be subjected to friction stir welding simultaneously or almost simultaneously without interfering with each other. As a result, the time taken to perform friction stir welding can be decreased, thereby implementing an efficient friction stir welding operation.

In this embodiment, by using the friction stir welding apparatuses 2 disposed on one side and on the other side, friction stir welding is started from the inner side of the sub frame structure 210 (see arrow R1 and arrow L1). However, the start point of friction stir welding is not restricted to the inner side of the sub frame structure 210. Instead, friction stir welding is started from the outer side of the sub frame structure 210. For example, the moving direction of the probe 32 of the friction stir welding apparatus 2 on one side may be set to be the direction of arrow R1→arrow R2→arrow R3→arrow R4→arrow R5→arrow R6 (which is the same as that described above), and the probe 32 of the friction stir welding apparatus 2 on the other side may be sequentially moved in the direction of arrow L4→arrow L5→arrow L6, and then may cross the protruding portion 242, and be further sequentially moved in the direction of arrow L1→arrow L2.

By the application of this embodiment to joint portions of the sub frame structure 210, the manufacturing of a vehicle suspension support member arranged in a double cross can be facilitated. However, this embodiment may also be applicable to joint portions of a dissimilar material welded structure, other than a vehicle, in which a plurality of flanges extend substantially in parallel with each other with a protruding portion therebetween. The present disclosure is not limited to the above-described embodiment, and variations and modifications may be made without departing from the scope of the present disclosure.

We claim:
1. A vehicle structure comprising:
an iron member including a first vertical wall and a first flange disposed continuously from the first vertical wall via a first bent portion therebetween; and
an aluminum member disposed above the iron member and including a second vertical wall and a second flange disposed continuously from the second vertical wall, wherein the second flange of the aluminum member is disposed above the first flange of the iron member and joined to each other, wherein the second flange includes a plane portion above the first flange, the plane portion extending toward the first vertical wall, wherein the first bent portion includes a base point on the first flange side thereof, the base point being a point at which a bent shape of the first bent portion starts, and wherein the plane portion of the second flange covers the iron member at least up to the base potion.

2. The vehicle structure according to claim 1, wherein friction stir welding is performed on the aluminum member toward the iron member in a state in which a sealing member is interposed between the first flange and the second flange to provide a welded joint portion, and wherein the following equation is satisfied:

$$S1 > S2$$

wherein (S1) is a distance between an axis (T1) of the first vertical wall of the iron member and a vertical center line (C) of the welded joint portion, and (S2) is a distance between an axis (T2) of the second vertical wall of the aluminum member and the center line (C) of the welded joint portion.

3. The vehicle structure according to claim 1, wherein the second flange of the aluminum member is disposed continuously from the second vertical wall via a second bent portion therebetween, wherein the following equation is satisfied:

$$R1 > R2$$

wherein R1 is a radius of curvature of an outer circumference of the first bent portion of the iron member, and R2 is a radius of curvature of an outer circumference of the second bent portion of the aluminum member.

* * * * *